Sept. 13, 1949.    R. L. RINGER, JR    2,481,617
REACTANCE MEASURING DEVICE
Filed June 23, 1944
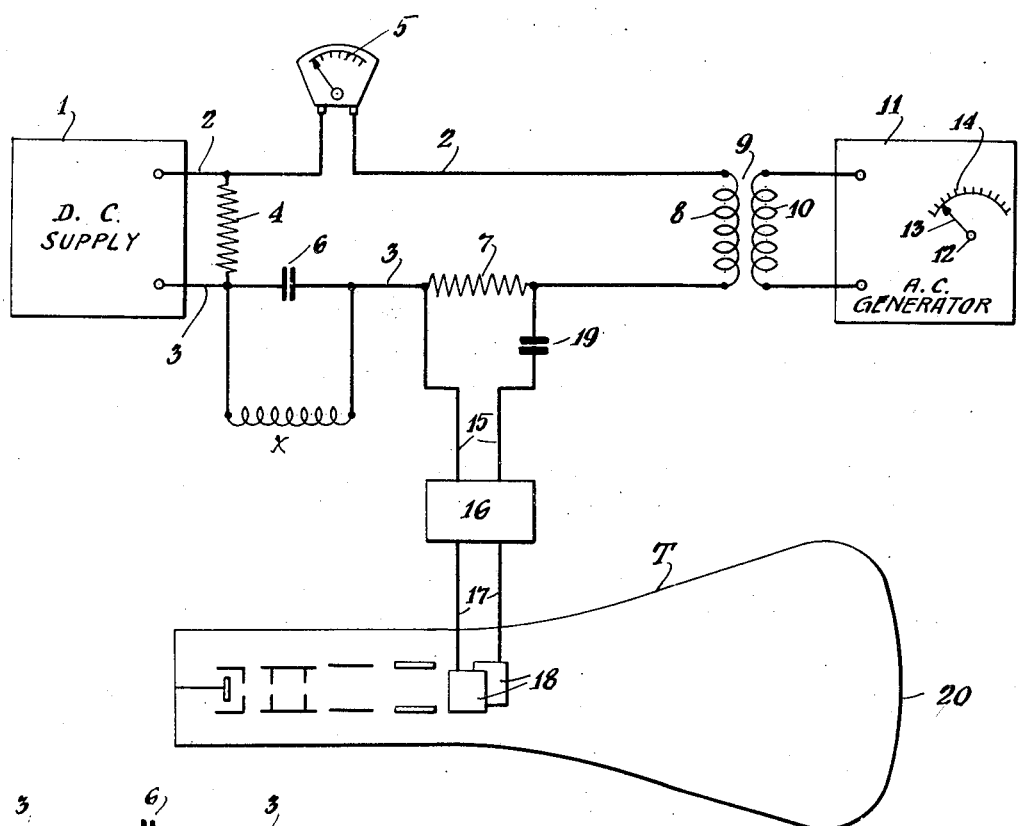
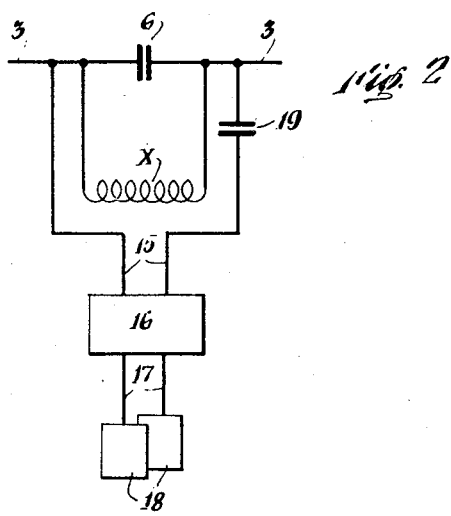
Robert Lee Ringer, Jr INVENTOR.
BY
Charles W. Mortimer
ATTORNEY Patented Sept. 13, 1949

2,481,617

UNITED STATES PATENT OFFICE 2,481,617

REACTANCE MEASURING DEVICE

Robert Lee Ringer, Jr., Jersey City, N. J., assignor to Allen B. Du Mont Laboratories, Inc., Passaic, N. J., a corporation of Delaware Application June 23, 1944, Serial No. 541,824

1 Claim. (Cl. 175—183)

This invention relates to a device for measuring inductances or capacitances. It is particularly useful for measuring the inductance of coils or other devices that possess inductive reactance and for measuring capacitances of condensers.

In carrying out the invention an inductometer or capacitance meter is provided by means of which inductances or capacitances of wide ranges can be ascertained very rapidly and accurately without requiring the skill of highly trained operators. The inductor to be measured, such as a coil, for example, is placed in parallel with a known condenser, or the condenser to be measured is placed in parallel with a known inductance, and alternating current is applied to the parallel combination at resonant frequency. The measurements may be taken even while direct current is flowing through the inductor.

The invention may be understood from the description in connection with the accompanying drawing in which:

Fig. 1 is a diagram of connections; and
Fig. 2 shows a modification of Fig. 1.

In the drawing, reference character 1 indicates a source of direct current, the voltage of which is variable but can be kept constant at y desired potential. Leads 2 and 3 extend om the supply 1. A resistor 4 is connected across nese leads and an ammeter 5 is located in lead 2. A capacitor 6 of known capacitance is located in the lead 3, and a resistor 7 is connected in series therewith. The secondary 8 of a transformer 9 is connected across the leads 2 and 3. The primary 10 of this transformer is connected to a source 11 of alternating current of constant voltage but variable frequency. This source of current is represented diagrammatically as such devices are well known.

A dial or control for varying the frequency is indicated at 12. It is provided with a pointer 13 and a graduated scale 14 for indicating the frequencies to which the alternator 11 is adjusted.

A cathode-ray tube T is indicated somewhat diagrammatically. The ends of resistor 7 are connected by leads 15 to amplifier 16 from which signals are fed by leads 17 to a pair 18 of the deflection plates of the tube T. A capacitor 19 is located in one of the leads 15.

Inductance is measured as follows: The reactor or inductor of which the inductance is to be measured or determined is connected at $x$, Fig. 1, in parallel with the fixed capacitor 6 of known capacitance. The capacitor 6 and inductor $x$ constitute a tank circuit in series with the resistors 4 and 7, ammeter 5 and the low impedance secondary 8 of transformer 9. The voltage of the D. C. supply 1 is adjusted so that the ammeter 5 indicates the direct current at which the inductance of coil $x$ is to be ascertained. The inductance may, however, be ascertained without any direct current. The frequency of the A. C. generator 11 which feeds the primary 10 of transformer 9 is adjusted to the frequency at which the tank circuit 6—$x$ is at resonance, which is the condition that obtains when the indication on the cathode-ray tube T is a minimum.

As indicated in Fig. 2, the cathode-ray tube 20 may be connected across the capacitor 6 and inductor $x$, which are in parallel, instead of being connected across the resistor 7. In this case the frequency at which the tank circuit 6—$x$ is at resonance is indicated by the maximum deflection indicated on the cathode-ray tube T.

Since the frequency and the capacitance 6 are known, the inductance $x$ can be calculated from the formula $$f = \frac{1}{2\pi\sqrt{LC}}$$

or the formula $$L = \frac{1}{4\pi^2 f^2 C}$$

Or the scale 14 may be calibrated directly in terms of inductance, i. e., in henrys with a given fixed capacitance 6.

This device is particularly useful for measuring inductance or capacitance since it can be calibrated so that the readings are directly in henrys or farads; it indicates the exact inductance or capacitance without including other impedance so that no errors occur by having resistance of the coil included in the readings; it can be used to measure the inductance of an unknown coil without the necessity of comparing it with a known coil or the capacitance of a capacitor without comparing it with a known capacitor; and its use requires little time and practically no training of the operator.

While the invention has been particularly described for measuring inductance, it will be clear that it is also adapted to the measurement of capacitance in the same way. This can be done by placing a known inductance where the capacitor 6 is and the unknown capacitor where the inductance $x$ is in either figure of the drawing.

What is claimed is:

A device for measuring a reactance, which comprises a source of alternating current of constant voltage but variable frequency, a transformer coupling said source to a circuit which comprises a reactive impedance of known value in series with a known resistance, said known impedance being in parallel with said reactance that is to be measured, and a reactance indicating device connected to opposite ends of said resistance that is located in said circuit, said indicating device comprising a cathode ray tube having a pair of its deflecting plates connected respectively to opposite ends of said resistor.

ROBERT LEE RINGER, Jr.

REFERENCES CITED

The following references are of record in the file of this patent:

UNITED STATES PATENTS

| Number | Name | Date |
|---|---|---|
| 1,960,333 | Du Mont | May 29, 1934 |

OTHER REFERENCES

Radio Instruments and Measurements, U. S. Bureau of Standards, 1918, pages 136-137.

Radio World, July 1936, pages 45-46.

Wireless World, Feb. 1944, article by Blackwell et al., pages 37-40.

Everitt, Communication Engineering, McGraw-Hill, 1937, pages 78-79.

Radio World, Dec. 1936; pages 12-13.